E. GRUENEWALD.
CLUTCH MECHANISM.
APPLICATION FILED JUNE 3, 1910.
1,126,448.
Patented Jan. 26, 1915.
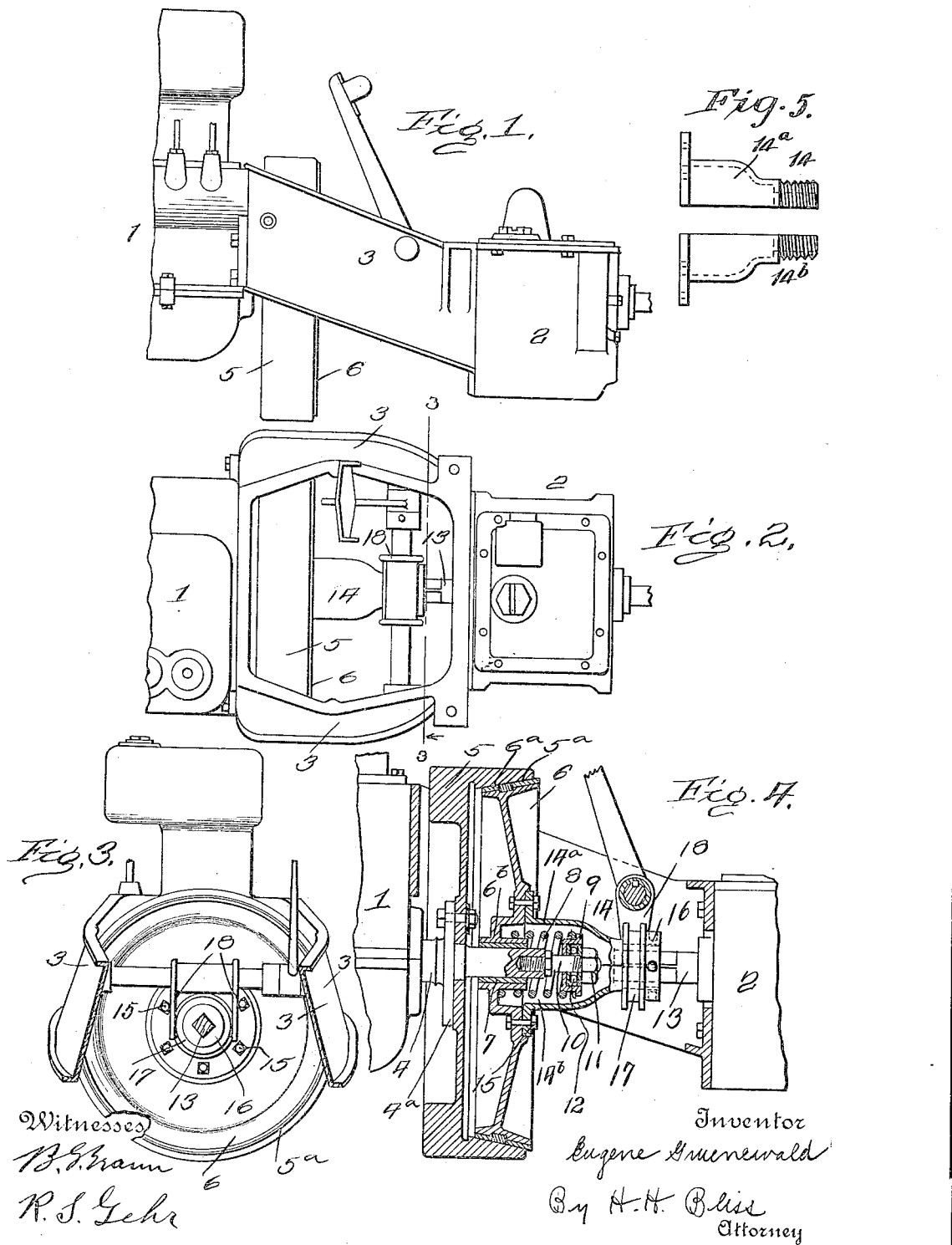

UNITED STATES PATENT OFFICE.

EUGENE GRUENEWALD, OF MOLINE, ILLINOIS, ASSIGNOR TO MOLINE AUTOMOBILE CO., A CORPORATION OF ILLINOIS.

CLUTCH MECHANISM.

1,126,448.          Specification of Letters Patent.          Patented Jan. 26, 1915.

Application filed June 3, 1910. Serial No. 564,809.

*To all whom it may concern:*

Be it known that I, EUGENE GRUENEWALD, citizen of the United States, residing at Moline, in the county of Rock Island and State of Illinois, have invented certain new and useful Improvements in Clutch Mechanism, of which the following is a specification, reference being had therein to the accompanying drawing.

This invention relates to clutch mechanism, and particularly to clutch mechanism of the character employed in motor vehicles.

The power devices of motor vehicles, as now commonly constructed, comprise a friction clutch mechanism which is interposed between the engine shaft and the shaft of the transmission gearing. Sometimes the casing of the transmission gearing is rigidly connected to the engine casing, and thus forms part of a unitary power plant structure. In other cases the casing of the transmission gearing is mounted upon the main chassis frame independently of the engine casing. In both forms of construction it is necessary from time to time to adjust and renew the parts of the clutch mechanism, and it is desirable that said mechanism be readily accessible and removable.

The principal object of my present invention is to provide a clutch mechanism of the character referred to having its adjustable parts readily accessible, and which can readily be entirely detached without disturbing either the engine or the transmission mechanism.

A further object is to provide a clutch mechanism having the characteristics referred to which shall be as simple as possible in construction.

In the accompanying drawings—Figure 1 is a side elevation of a part of a power mechanism for motor vehicles embodying my invention. Fig. 2 is a plan view of the same. Fig. 3 is a vertical section taken on the line 3—3 of Fig. 2. Fig. 4 is a vertical longitudinal section through the clutch mechanism proper.

Referring in detail to the construction, 1 is an engine casing, 2 the casing which incloses the transmission gearing, and 3, 3 are arms which rigidly connect the transmission casing to the engine casing, the whole forming a rigid unitary power plant structure.

4 is the shaft of the engine which, as will be understood, may be mounted upon the chassis frame in any preferred manner. The shaft 4, as shown, is provided near its rear end with an outwardly turned flange $4^a$ to which is bolted the engine fly wheel 5. The fly wheel is formed with a conical clutch face $5^a$, the fly wheel forming, as is usual, the fixed element of the friction clutch.

6 is the sliding element of the clutch, it being in the form of a disk having an outer conical clutch face $6^a$ adapted to engage the clutch face $5^a$. The outer rim of the clutch element 6 is provided with suitable facing material. At its center, the disk 6 is formed with a hub or sleeve $6^b$ which slides upon the reduced end of the engine shaft 4, a sleeve 7 of suitable bearing metal being interposed.

8 is a coiled spring which presses at one end against the clutch element 6, and at its other end against a flanged collar 9 which is mounted upon a stud bolt 10 screwed into the rear end of the engine shaft 4. A nut 11 on the stud bolt 10 takes the thrust of the spring, an anti-friction bearing 12 being interposed between the collar 9 and the nut. The spring, it will be seen, tends normally to force the two clutch elements into engagement with each other. By adjusting the nut 11, the tension of the spring 8 can be varied as desired.

13 is the initial shaft of the transmission mechanism and will hereafter be referred to as the driven shaft. This shaft extends through the front wall of the transmission casing 2 in axial alinement with the engine shaft. To connect the sliding element 6 of the clutch with the driven shaft 13, I provide a tubular shaft section 14 which, as shown, is divided longitudinally into two elements, $14^a$ and $14^b$ respectively, the division preferably being as shown upon an axial plane. The front end of the shaft section 14 is formed with an out-turned flange which is secured by means of bolts 15 to the clutch element 6. At its rear end the shaft 14 is squared to fit slidably upon the squared end of the driven shaft 13, and is threaded externally to receive a nut 16. This nut clamps the rear ends of the parts $14^a$, $14^b$ of the shaft section 14 securely together; it also serves as an abutment for the thrust bearing 17 which is interposed between it and the forked arm 18 of the clutch shifting lever.

The tubular shaft section 14 forms a casing which incloses the coiled spring and the thrust bearing 12 so that the latter can be packed in hard oil, and both lubrication and thorough protection from dust are secured.

The operation of the clutch will be readily understood. The sliding clutch element 6 is normally held in engagement with the clutch face 5ª of the fly wheel by the spring 8. With the parts thus engaged, the rotation of the engine shaft and fly wheel is transmitted through the clutch element 6 and the shaft section 14 to the driven shaft 13. The clutch is disengaged by throwing the lever arm 18 rearward which causes the shaft section 14 and the clutch element 6 to move in the same direction against the tension of the spring 8. In this movement the rear end of the shaft section slides upon the driven shaft 13 while the clutch element 6 slides upon the rear end of the engine shaft 4.

By reason of the construction above set forth, the connecting sleeve 14 is movable out of its normal operative position and can be so moved either to permit adjustment of the nut 11 or to permit removal of the movable clutch element 6. In the construction shown the movement of the shaft section 14 out of its normal position is made possible by the formation of it in two parts separable along a longitudinal plane, but so far as the broader aspects of my invention are concerned there can be variation from this exact construction.

With the construction shown, if it is desired to adjust the tension of the spring 8 to vary the gripping pressure of the clutch elements, it is only necessary to unscrew the nut 16, slide it and the thrust bearing 17 rearward on the shaft 13, and remove the nuts of bolts 15 when the shaft section 14 can be removed in its two halves thus exposing the spring, the ball thrust bearing and the adjusting nut 11 of the stud bolt. The nut 11 can then be turned to effect the desired adjustment.

Sometimes, as above suggested, it is desirable to entirely remove the clutch parts for the purposes of repair and renewal, and with the construction shown this is readily accomplished in the following manner: After unscrewing the nut 16, sliding it and the bearing 17 rearward on the shaft 13, and removing the shaft section 14, as above described, the nut 11, bearing 12, spring 8 and stud bolt 10 can then be readily removed. There is then room for the clutch to slide back off the engine shaft and out between the end of said shaft and the end of the transmission shaft.

All of the disassembling operations can be effected very easily and quickly, and the entire removal of the clutch mechanism is accomplished without in any way disturbing either the engine or transmission mechanism. This result is especially to be desired where the transmission constitutes a part of the unitary power plant structure, as in the construction shown, but it will be readily understood that such result is advantageous in other cases where the transmission mechanism is mounted upon the main chassis frame independently of the engine.

As all of the clutch members and connected parts are circular in transverse section, or in other words, are symmetrical about the axis of rotation, the construction is thoroughly well balanced.

What I claim is:—

1. The combination with a drive shaft and a transmission shaft in axial alinement therewith but spaced therefrom, of a clutch having its movable member of an axial length no greater than the distance between the drive shaft and transmission shaft, the said movable clutch member being sleeved on the end of the drive shaft, and a coupling shaft detachably secured to the movable clutch member slidably engaging the transmission shaft and movable from its normal position to uncover the space between the drive and the transmission shafts.

2. The combination of a drive shaft, a clutch having an axial moving clutch member slidably mounted on the drive shaft, an abutment carried by the drive shaft, a helical spring interposed between the abutment and the movable clutch member, a driven shaft axially alined with the drive shaft but separated therefrom a distance greater than the axial length of the movable clutch member, and a hollow coupling shaft detachably connected to the axially movable clutch member having slidable engagement with the transmission shaft and movable from its normal position to a position uncovering the space between the drive and driven shafts.

3. The combination with a drive shaft and a transmission shaft having their adjacent ends in normal alinement and spaced from each other, of a clutch having its movable member of an axial length no greater than the distance between the drive shaft and transmission shaft, a helical centrally disposed clutch-operating spring, and a hollow coupling shaft detachably connected to the movable clutch member inclosing the said spring and having slidable engagement with the transmission shaft.

4. The combination with a drive shaft and a transmission shaft having their adjacent ends in axial alinement but spaced from each other, of a clutch having its movable member sleeved upon the end of the drive shaft and of an axial length no greater than the distance between the ends of the said shafts, a removable abutment secured to the end of the drive shaft, a concentric helical spring interposed between the said abutment and the movable clutch member, and a hollow coupling shaft connecting the movable clutch member and having slidable engagement with the transmission shaft.

5. The combination with the axially alined driving and driven shafts, of a clutch member on the driving shaft, an axially movable clutch member adapted to operatively engage the first clutch member, and a sectional coupling shaft detachably secured to the axially movable clutch member and slidably engaging the driven shaft, the sections of said coupling shaft being separable on longitudinal lines of division.

6. The combination with the axially alined driving and driven shafts, of a clutch member on the driving shaft, an axially movable clutch member adapted to operatively engage the first clutch member, an abutment carried by the driving shaft, a helical spring interposed between said abutment and the axially movable clutch member, and a hollow sectional coupling shaft inclosing the said spring and abutment, the sections of said shaft being separable on longitudinal lines of division and said shaft being detachably connected to the axially movable clutch member and having slidable engagement with the driven shaft.

7. The combination with the axially alined driving and driven shafts, of a clutch member on the driving shaft, an axially movable clutch member adapted to operatively engage the first clutch member, a detachable extension mounted on the end of the driving shaft adjacent the driven shaft, a spring abutment on said extension, a coiled spring between the said abutment and the axially movable clutch member, and a hollow sectional coupling shaft inclosing the driving shaft extension, the abutment and the said spring, the sections of said shaft being separable on longitudinal lines of division and said shaft being detachably connected to the axially movable clutch member and having sliding engagement with the driven shaft.

8. The combination with the axially alined driving and driven shafts, of a clutch member on the driving shaft, an axially movable clutch member adapted to operatively engage the first clutch member, and a sectional coupling shaft detachably secured at one end directly to the axially movable clutch member and having at its other end slidable engagement with the driven shaft, the sections of the said coupling shaft being separable on longitudinal lines of division.

In testimony whereof I affix my signature, in presence of two witnesses.

EUGENE GRUENEWALD.

Witnesses:
W. H. VANDERVOORT,
H. A. SOVERHILL.

Copies of this patent may be obtained for five cents each, by addressing the "Commissioner of Patents, Washington, D. C."